United States Patent Office 2,961,352
Patented Nov. 22, 1960

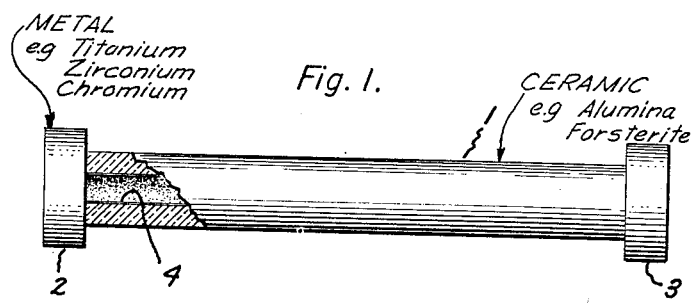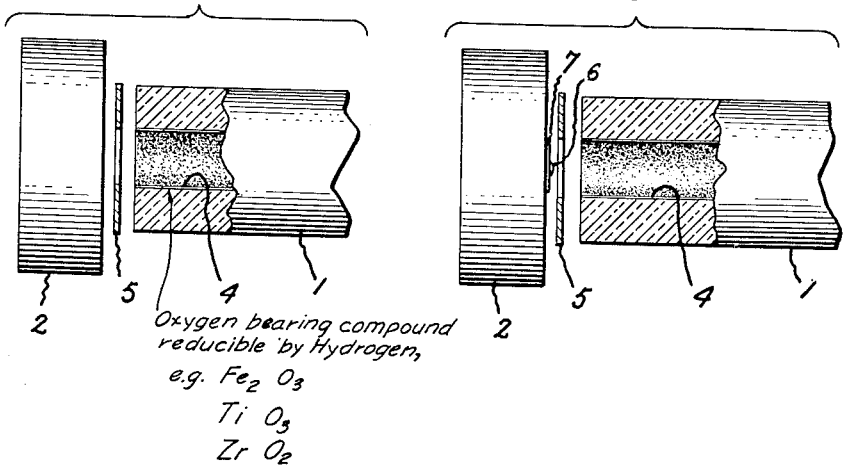

2,961,352

RESISTANCE FILMS AND METHOD OF MAKING

Walter Grattidge and James E. Beggs, Schenectady, N.Y., assignors to General Electric Company, a corporation of New York Filed Jan. 2, 1957, Ser. No. 632,054

3 Claims. (Cl. 117—229)

The present invention relates to improved vacuum type electrical resistance films and improved methods of making.

In copending application of James E. Beggs, Serial No. 464,080, filed October 22, 1954, entitled "Conducting Films," and assigned to the assignee of this application, is described and claimed a method of making conducting films of relatively high resistance or, stated in another way, resistance films with moderately low resistivity. In accordance with the method there outlined, film resistances in the order of a few thousand ohms in a vacuum-tight envelope are readily realized. In many applications, however, particularly in the electronics field, it is desirable to obtain resistances up to several megohms and the present invention relates particularly to improved vacuum type resistors having relatively high resistances.

It is an important object of the present invention to provide improved vacuum type resistors which may have resistances up to several megohms which are readily reproduced on a mass production basis and which maintain reasonable stability with life.

It is another object of the invention to provide an improved method of making resistance films in accordance with which the magnitude of the resistance and the temperature coefficient of resistance may be readily controlled during manufacture.

In accordance with illustrated embodiments of the present invention, a support and enclosure for the resistance film is provided by a hollow cylindrical ceramic member open at opposite ends and closed during fabrication of the resistor by end caps which hermetically seal the ceramic cylinder and provide the terminals for the resistance film. The film itself is formed on the inner surface of the ceramic by the reduction of an oxygen containing metallic compound reducible in hydrogen and is preferably selected from the group consisting of $Fe_2O_3$, $TiO_2$ and $ZrO_2$. The oxygen-bearing compounds are selected from those that may be reduced by molecular or atomic hydrogen, based on a consideration of free energies. A compilation of free energies of these oxygen-bearing compounds at high temperatures is contained in the Journal of the American Ceramic Society, vol. 38, 1955, pages 432–437 in an article entitled "Thermodynamic Data on Oxides at Elevated Temperatures," by Tripp and King. The free energy of formation of water from atomic hydrogen is not referred to in this article, but a curve of this energy would lie approximately parallel to the $2H_2O$ curve approximately 90 kilo calories below the $2H_2O$ curve of Figure 1 of the article. These curves mean that compounds having curves above the $2H_2O$ curve may be reduced by molecular (or atomic) hydrogen while those lying below the $2H_2O$ curve and above the atomic hydrogen curve may be reduced, energetically, only by atomic hydrogen. The oxide is applied to the inner surface of the ceramic in the form of a powder suspension in a suitable carrier or binder which is fast drying and essentially all of which may be driven off during the subsequent heating step, such as amyl acetate or a nitrocellulose lacquer.

In accordance with a preferred method of making the resistance elements, the applied layer is reduced by atomic hydrogen released during the fabrication of the envelope. The atomic hydrogen may be provided by a previously hydrogen saturated metal shim used in the sealing of the end cap or by the decomposition of a suitable metal hydride, such as titanium or zirconium hydride. The hydride may be supported on a nickel support or as an alternative may be applied to the end caps or to the ends of the ceramic cylinder as a part of the process of bonding the end caps to the ceramic.

Further objects and advantages of the present invention will become more apparent as the following description proceeds, reference being had to the accompanying drawing in which Fig. 1 is an elevational view of a completed vacuum resistor embodying my invention and Figs. 2 and 3 show a portion of the resistor of Fig. 1 and illustrate two methods of manufacture.

As illustrated in Fig. 1, the completed resistor includes a hollow cylindrical ceramic body 1 hermetically sealed at opposite ends by metal disk-like caps 2 and 3. These caps may to advantage be formed of an active metal such as titanium or zirconium and the ceramic is selected to have a reasonable expansion characteristic with respect to the metal chosen for the end terminals. If the end terminals are titanium, alumina or a forsterite ceramic is desirable. The forsterite has desirable expansion characteristics but is limited to temperature in the order of 1000° C. or below. The bore of the ceramic cylinder 1 is preferably provided with a smooth surface to which the constituents from which the resistance film 4 is formed are applied, either by painting or spraying.

In accordance with a specific method of fabricating a resistor such as shown in Fig. 1, the ceramic cylinder 1 is lapped at the ends and the surface of the bore smoothed by grinding. These operations tend to increase the speed at which the bond may be made to the end surfaces of the cylinder and to improve the uniformity and adherence of the resistive coating to the surface of the bore. Also, prior to the production of the resistive film and fabrication of the resistance device, the component parts are treated. The ceramic cylinder 1 and the end caps 2 and 3 which, in the specific example now described, are titanium, are vacuum-fired at an elevated temperature. A temperature in the order of 1000° C.–1350° C. for a period of about one hour to five minutes, respectively, produces very clean ceramic while 5 to 30 minutes degasses the end caps. The parts thus treated function satisfactory in the subsequent processing and lend stability to the characteristics of the device during its life. A nickel shim or washer 5 which is interposed between the titanium end cap and the ceramic cylinder to effect a reactive alloy seal, is fired in hydrogen for a period of approximately ten minutes at a temperature of about 1000° C. With this treatment, the nickel shim in contact with the titanium end cap provides a source of atomic hydrogen during the subsequent heating step of the process. The reducible oxygen-bearing compound is suspended in a fast-drying liquid, essentially all of which may be driven off during the subsequent heating. In making of one specific resistor, $3/10$ gram of iron oxide ($Fe_2O_3$) and about 3 cubic centimeters of amyl acetate with a few drops of nitrocellulose lacquer are mixed together and applied as a thin uniform coating on the surface of the bore of ceramic cylinder 1. The application may be carried out to advantage by rotating the ceramic cylinder 1 and applying with a brush from which the excess suspension has been shaken or scraped off. The parts are then assembled in a stack and placed in a bell jar, with the parts of the assembly being held in position by either spring or weight loading. The bell jar is exhausted to a pressure in the order of 1/10 of a micron and then heating is started. The heating may to advantage be accomplished by radiation from a thin metal shield oven enclosing the resistor which is heated by high frequency currents in a manner well understood by those skilled in the art. A suitable heating schedule for forming the film and sealing the envelope of the specific embodiment just described includes two minutes at 700° C., two minutes at 875°–925° C. and one minute at 1000° C. The actual temperature of sealing of the end caps to the ceramic cylinder utilizing titanium end caps and nickel shims is about 955° C. and the sealing may be observed to take place at about the middle of the last heating step outlined above. During the heating schedule, hydrogen is released from the nickel in contact with the titanium and this hydrogen, in atomic form, is effective to reduce the $Fe_2O_3$ and provide a resistance film, having a resistance in the order of 30,000 ohms. As indicated earlier, the magnitude of the resistance depends partially upon the material reduced and the number of layers applied. It may also be controlled by the length and temperatures of the heating operation. The resistance of the film decreases with increasing time and temperature. With a final temperature of about 25° C. lower, the resistance is increased by approximately a factor of 10. A very satisfactory way of establishing a desired heating schedule is to measure the actual resistance between the terminals as the heating proceeds, terminating the heating operation as the desired resistance is obtained. A schedule may be readily established in this way which thereafter may be repeated to produce resistors having reasonably uniform resistance values. In the above heating schedule, it will be noted that the temperature is brought to the final temperature in steps. This gradual increase in temperature is preferable to a more abrupt heating to the final temperature.

A number of considerations are involved in the selection of materials for a particular resistor and these in turn affect the exact heating schedule utilized.

In those cases where the resistor is to be hermetically sealed at the same time that the resistance film is formed, it is apparent that the final heating step must be at a temperature sufficiently high to effect the alloying of the washer with the end cap and the bonding to the ceramic cylinder. If a lower melting point combination of metals for the end cap and shield is used, it is necessary that the temperature of the final heating step in the production of the resistor not be so high as to produce an undesirable vapor pressure of the materials involved in the sealing operation. In general, the resistance films may be formed at lower temperatures by increasing the length of the heating steps.

The method of bonding a metal member to a ceramic by forming a reactive alloy with the metal and a shim member is described and claimed in the copending Beggs application, Serial No. 409,159, filed February 9, 1954, and now Patent No. 2,857,663, entitled "Metallic Bond," and assigned to the assignee of this application. Further examples of combinations of materials suitable for this method of bonding and the approximate temperatures at which the bond may be made are described in that application.

In the above example, $Fe_2O_3$ has been described as the reducible oxygen-containing compound from which the resistance film is formed. As stated earlier in the specification, other materials of this class which decompose in the presence of hydrogen, based on a consideration of free energy, may also be employed. Other oxides such as $TiO_2$, $ZrO_2$, $Ta_2O_5$, $V_2O_3$, $Cr_2O_3$, $MnO_2$, $Cb_2O_5$ may also be employed. Suboxides of these materials may also be employed and these include such oxides as $Fe_3O_4$, $FeO$, $TiO$, $Ti_2O_3$, $Ti_3O_5$, $VO$, $VO_2$, $Mn_3O_4$, $Mn_2O_3$, $MnO$, $CbO_2$ and $CbO$. Other compounds which dissociate to one or more oxides may also be employed, for example, $FeTiO_3$, $FeCr_2O_3$, $FeAl_2O_3$ and the like may also be reduced to form a film. Examples of oxides which do not decompose in the presence of hydrogen, either atomic or molecular, and therefore are not suitable for the film-forming suspension include $CaO$, $BeO$, $SrO$, $BaO$, $MgO$, $Al_2O_3$ and $ThO_2$. The $MgO$ or $Al_2O_3$ may form the major constituents of suitable ceramics for the film supporting member.

In Fig. 3, I have illustrated a portion of the resistor of the type shown in Fig. 1 for the purposes of explaining a modified method of forming the resistance film. In accordance with the method of this embodiment of the invention, the atomic hydrogen for reduction of the material applied to the bore, is supplied by a small quantity of titanium or zirconium hydride. As shown in Fig. 3, the ceramic cylinder 1, end cap 2, the nickel shim 5 and the applied layer of $Fe_2O_3$ are all essentially the same, as described in connection with Fig. 2. In addition, a small droplet of titanium hydride 6 is applied directly on the center of the end cap 2 or on the surface of a small patch of nickel 7 which has been welded to the center of the titanium disk. The assembly may be made and processed in exactly the same manner described in connection with Fig. 2 except that the hydride droplet decomposes to liberate atomic hydrogen during the heating step, thus providing a different source of atomic hydrogen than described in connection with Fig. 2.

It should also be appreciated that the present invention is not limited to the particular method of sealing the resistor described here and may, for example, utilize other known methods such as the titanium hydride method in which the end of the ceramic cylinder is painted with titanium hydride and the shim 5 could then be eliminated, the bond being made to the end cap, either with or without an additional solder, depending upon the metal of the end cap.

While atomic hydrogen is preferred, since it reduces compounds not reduced by molecular hydrogen, the latter may be used in those cases where the compound decomposes in the presence of molecular hydrogen, based on a consideration of free energies.

As an indication of the film-forming properties of some of the other materials mentioned, the resistance of films formed on a clean ceramic surface by heating the following oxides in contact with nickel-titanium alloy for one minute at 1050° C. are as follows: $Fe_2O_3$—70,000 ohms; $TiO_2$—50,000 ohms; $ZrO_2$—300,000 ohms; $MnO_2$—1,000,000 ohms; $Ta_2O_5$—1,000 ohms; $Cb_2O_5$—200,000 ohms; and $V_2O_5$—800 ohms.

In the foregoing description, particular emphasis has been placed on resistors that may be fabricated at temperatures of about 1000° C. and utilized at operating temperatures up to about 800° C. Other oxides, such as $SiO_2$, for example, form resistance films of useful magnitude when processed at higher temperatures and are capable of withstanding higher operating temperatures. In such a case, the envelope seal must be capable of withstanding higher temperatures and chromium end caps may be employed with titanium washers for this purpose.

From the foregoing, it is apparent that our invention provides improved vacuum resistors and methods of making which are particularly suited to the production of relatively high resistance values and that these resistances and the coefficients of resistance may be reproducibly controlled during manufacture. The formation of the film within a vacuum which is established during fabrication and production of the resistance films provides a stable characteristic with life of the resistor. Resistors made in accordance with the present invention have operated for over 1500 hours at 500° C. without a material change in resistance.

While particular embodiments of our invention have been described, it will be apparent to those skilled in the art that changes and modifications may be made without departing from our invention in its broader aspects and we aim therefore in the appended claims to cover all such changes and modifications which fall within the true spirit and scope of our invention.

What we claim as new and desire to secure by Letters Patent of the United States is:

1. The method of making a vacuum resistor including a resistive coating on a surface of a ceramic member exposed to the interior of an enclosure, the ceramic member having as a major constituent an oxide which does not decompose at a temperature within a predetermined range of elevated temperatures in the presence of hydrogen and selected from the group consisting of magnesium oxide and alumina, which method comprises applying to said surface of said ceramic member a metallic oxide which is decomposed at a temperature within said predetermined range in the presence of hydrogen, evacuating the enclosure, heating the coated surface of the ceramic member to a temperature below the melting point of said oxygen-containing compound and subjecting the coated surface thereof to an atmosphere of hydrogen while at a temperature within said range to decompose said oxygen bearing compound and provide a resistance film on said ceramic, continuing the evacuation of the enclosure and sealing the enclosure to provide a vacuum resistor.

2. The method of making an evacuated resistance device including a resistive coating on an inner wall of a hollow ceramic member having as a major constituent an oxide which does not decompose at a temperature within a predetermined range of elevated temperatures in the presence of atomic hydrogen and selected from the group consisting of magnesium oxide and alumina, which method comprises applying to an inner surface of said ceramic an oxide of iron which is decomposed at a temperature within said predetermined range in the presence of atomic hydrogen, heating the coated ceramic to a temperature within said range but below the melting point of said oxide of iron and subjecting the ceramic to an atmosphere of atomic hydrogen while at said last mentioned temperature to decompose said oxide and provide a resistance film on said ceramic, evacuating the hollow ceramic member and sealing the member to provide an evacuated enclosure having a resistance film on an interior wall thereof.

3. The method of making an evacuated resistance device including a resistive coating on an inner surface of a hollow ceramic member having as a major constituent an oxide which does not decompose at a temperature within a predetermined range of elevated temperatures in the presence of atomic hydrogen and selected from the group consisting of magnesium oxide and alumina, which method comprises applying to said inner surface of said ceramic member a metallic oxide which is decomposed at a temperature within said predetermined range of elevated temperatures in the presence of atomic hydrogen, evacuating the hollow member, heating the coated ceramic member to a temperature within said range but below the melting point of said oxygen-containing compound, subjecting the coating to an atmosphere of atomic hydrogen while at said last mentioned temperature to decompose said oxygen bearing compound and provide a resistance film on said ceramic, continuing the evacuation of said hollow member and sealing said member to provide an evacuated hermetically sealed device.

References Cited in the file of this patent

UNITED STATES PATENTS

| 1,023,485 | Thowless | Apr. 16, 1912 |
| 2,570,248 | Kelley | Oct. 9, 1951 |
| 2,647,218 | Sorg et al. | July 28, 1953 |
| 2,667,427 | Nolte | Jan. 26, 1954 |
| 2,686,958 | Eber et al. | Aug. 24, 1954 |
| 2,857,663 | Beggs | Oct. 28, 1958 |

FOREIGN PATENTS

| 157,052 | Australia | June 15, 1954 |